Oct. 12, 1943.  F. CARTLIDGE  2,331,766
CUTTER CHAIN
Filed Aug. 29, 1941
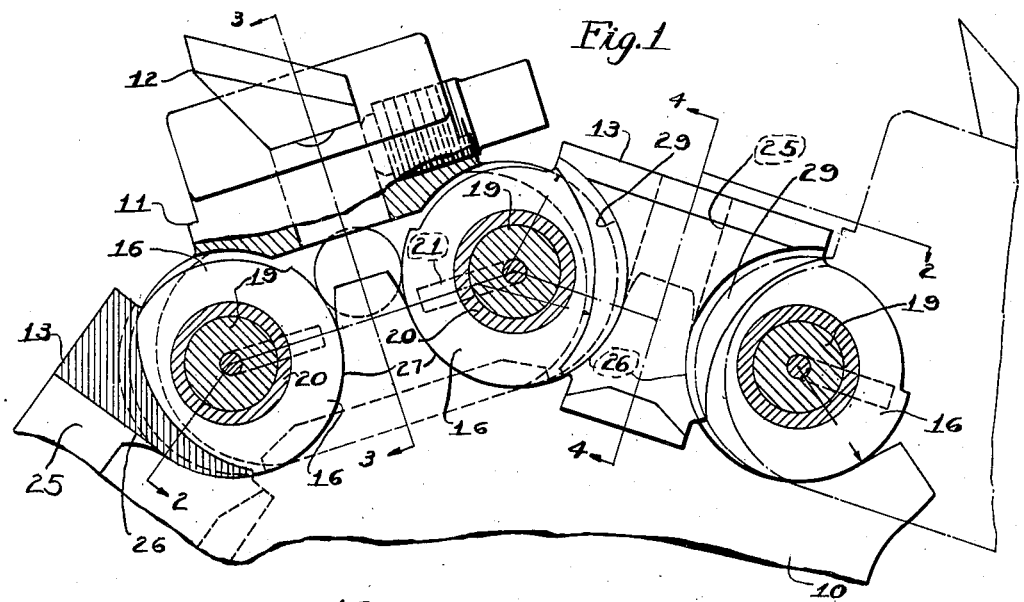
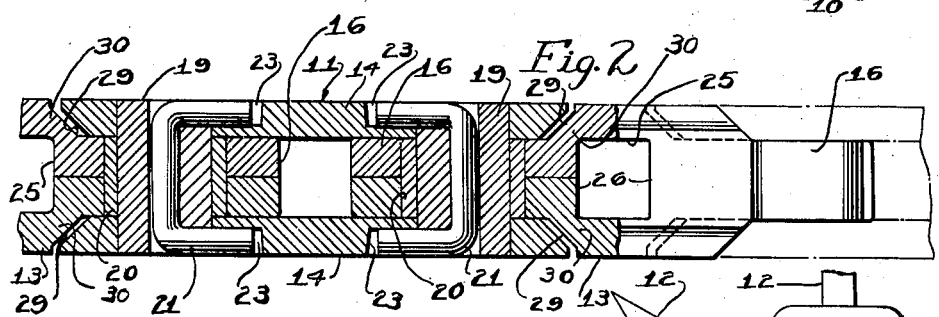
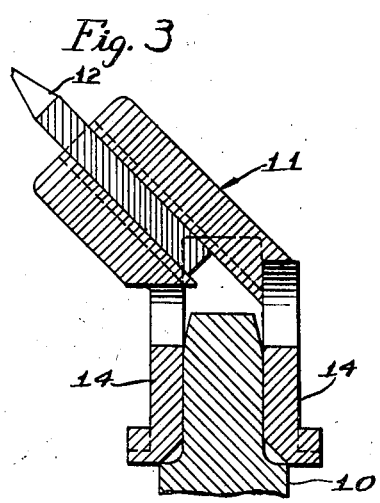
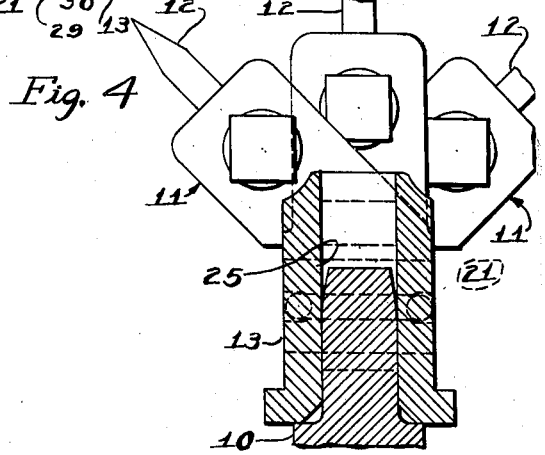
INVENTOR.
Frank Cartlidge
BY
Clarence F. Poole
ATTORNEY Patented Oct. 12, 1943

2,331,766

UNITED STATES PATENT OFFICE 2,331,766

CUTTER CHAIN

Frank Cartlidge, Chicago, Ill., assignor to Goodman Manufacturing Company, Chicago, Ill., a corporation of Illinois Application August 29, 1941, Serial No. 408,865

7 Claims. (Cl. 74—251)

This invention relates to improvements in cutter chains for mining machines.

Heretofore, the standard mining machine cutter chain has been so constructed that the sprocket teeth have engaged alternate links of the chain only, but due to the heavy loads on mining machine cutter chains and the present practice of increasing the length of the cutter bar, to increase the depth of cut in the coal face, it is advantageous that there be sprocket tooth engagement in each link of the chain, in order to provide a smoother running chain and to reduce buckling thereof during the cutting operation and thus to increase the efficiency of the chain and reduce the power required to drive it.

It has been attempted to strengthen standard pitch cutter chains so a sprocket tooth may engage each link of the chain, by forming the ends of the yokes of the bit carrying blocks of the chain on a shorter radius than that on which the ends of the eyes of the connecting links are formed, to avoid taking away metal from the connecting link to give clearance for the yoke, as is disclosed in the Lee Patent No. 2,046,064. While this construction permits some increase in metal in the connecting link around the sprocket tooth receiving recess, it requires rather precise machining of the shoulders of the connecting links and the ends of the legs of the yokes and still necessitates the taking of considerable stock from the connecting links, around the sprocket tooth receiving recesses, to provide clearance. It is also undesirable to increase the pitch of the chain over present day standards in order to remedy this condition, because more chains replace worn out chains than are used for new machines, and the redesign and replacing of a number of expensive parts of an old machine, to enable it to use a chain of an increased pitch, would be uneconomical.

The principal objects of my invention are to provide a cutter chain of a standard pitch, which has sprocket tooth receiving recesses in each link of the chain and which is so arranged as to provide a maximum amount of metal in the links of the chain adjacent the sprocket tooth receiving recesses thereof to provide a stronger chain than formerly, which has ample strength to withstand the rigorous stresses imparted thereto during cutting.

A more specific object of my invention is to provide such a chain which is of an alternate yoke and eye construction, wherein the legs of the yokes of the chain are recessed within the next adjacent connecting links, and to avoid the cutting away of metal from the connecting links of the chain and the weakening of the chain at the sprocket tooth receiving portions thereof by beveling the curved end faces of the legs of the yokes of the chain and correspondingly beveling the shoulders of the recessed portions of the connecting links thereof, to provide clearance for the legs of the yokes of the chain and to provide a self-cleaning joint between the yokes and connecting links of the chain.

Other objects of my invention will appear from time to time as the following specification proceeds and with reference to the accompanying drawing wherein:

Figure 1 is a fragmentary view in side elevation of a cutter chain constructed in accordance with my invention, showing the chain trained around a drive sprocket, with certain parts of the chain broken away and certain other parts shown in section;

Figure 2 is a fragmentary sectional view of the chain taken substantially along line 2—2 of Figure 1, but showing the chain straightened out;

Figure 3 is a transverse sectional view taken substantially along line 3—3 of Figure 1; and Figure 4 is a transverse sectional view taken substantially along line 4—4 of Figure 1.

In Figure 1 of the drawing, the cutter chain is shown as being trained around a drive sprocket generally indicated by reference character 10, and comprises generally a plurality of bit carrying links 11, 11 having cutter bits 12, 12 mounted therein, with a plurality of connecting links 13, 13 connecting said bit carrying links together. As shown in the drawing, each bit carrying link is of a well known yoke construction having a pair of parallel spaced legs 14, 14, recessed within the sides of the connecting links 13, 13 and adapted to embrace eyes 16, 16 at opposite ends of said connecting links.

The legs of the yokes of said connecting links are provided with aligned apertures adjacent opposite ends thereof, for receiving pivotal connecting pins 19, 19. As herein shown, each of said connecting pins extends through opposite legs of said yokes and through a bearing sleeve 20, which is mounted in the eye 16 of the connecting link 13. Each of said pins is held in position in said legs and is held from turning movement with respect to said yoke by means of a locking pin 21. Said locking pin is herein shown as extending through said pivotal pin and as having its ends bent over in a U-shaped form, to extend within slotted portions of said pin and to engage slots 23, 23 formed in the legs of said yoke.

Each connecting link 13 is herein shown as being of a split construction in order to simplify the machining thereof, and is provided with a central sprocket tooth receiving recess 25 having opposite faces 26, 26 adapted to provide sprocket tooth bearing surfaces. The lower portions of the end faces of the eyes 16 of said connecting links are formed on a uniform radius, which is the same as the radius of curvature of the face 26. Said end faces of said eyes extend between the legs of the yokes of said bit carrying links and form sprocket tooth bearing surfaces within said yokes, as is indicated by reference character 27 in Figure 1.

The eyes of said connecting links are of a lesser thickness than the body portion thereof, to permit the legs 14 to be recessed within the sides of said links, and arcuate inner shouldered faces 29, 29 extend from said eyes to the body portion of each link. Said shouldered faces are formed on substantially the same radii as the radius of curvature of the portions 26 and 27 of said eyes and are beveled from the inner to the outer sides thereof, towards the center of said link, leaving relatively thick walls between said sprocket tooth receiving recess and said beveled shouldered portion, as is indicated by reference character 30 in Figure 2.

The ends of the legs of each yoke of the bit carrying links are formed on radii which are herein shown as being the same as the radius of curvature of the sprocket tooth engaging faces 26, 26 and 27, 27 of said eyes, but said radii are offset from the turning centers of said links, to permit clearance between said legs and the shouldered portions of said connecting links without necessitating the taking away of metal from said connecting links adjacent the sprocket tooth receiving portions thereof. Likewise, the ends of said yokes are beveled inwardly from the outer to the inner sides thereof, to conform to the bevel of the shouldered portions 29, 29 of said connecting links. As herein shown, the radii of all portions of said beveled faces are the same but the centers thereof have been offset, to provide a beveled surface, all portions of which are formed on radii of the same length.

This construction besides permitting an increased amount of metal to be provided in the connecting links, adjacent the sprocket tooth receiving recesses thereof, and in the legs of the yokes of the chain adjacent the pivotal pins connecting the links of the chain together, also permits the adjoining beveled surfaces between the ends of said legs and said shouldered portions of said connecting links to wipe or squeeze material towards the outer sides of the chain, during operation thereof, to provide a self-cleaning chain arranged to clear coal dust or other foreign matter from the joints of the chain.

It may further be seen that the nature of construction of the chain is such that the beveled ends of the legs of the yokes of the chain and the beveled shouldered portions of the connecting links may be formed by simple forging operations, thus reducing the necessity of forming these parts of the chain to size by precise machining operations.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a cutter chain for mining machines, a plurality of links pivotally connected together, said links being of an alternately arranged yoke and connecting eye construction and each having a recess therein for receiving a sprocket tooth, and the legs of each yoke having arcuately formed inwardly beveled ends and being recessed within the sides of the next adjacent connecting links, the shouldered faces of the recessed portions of said connecting links being beveled to conform to the bevel of the ends of the legs of said yokes, to provide stock in said connecting links adjacent the sprocket tooth receiving recess thereof.

2. In a cutter chain for mining machines, a plurality of links pivotally connected together, said links being of an alternately arranged yoke and connecting eye construction and each of said links having a sprocket tooth receiving recess formed therein, the legs of each yoke having beveled ends the faces of which are formed inwardly on the same radius and said legs being recessed within the sides of the next adjacent connecting links, and the shouldered faces of the recessed portions of said connecting links being beveled to conform to the bevel of the ends of the legs of said yokes, to provide stock in said connecting links adjacent the sprocket tooth receiving recess thereof, and to prevent the clogging of material between the ends of said yokes and said shouldered faces during pivotal movement of said links with respect to each other.

3. In a cutter chain for mining machines, a plurality of links pivotally connected together, said links being of an alternately arranged yoke and connecting eye construction and each of said links having a sprocket tooth receiving recess formed therein, and the legs of each yoke having beveled ends formed inwardly on radii of the same length, but struck from different centers, and being recessed within the sides of the next adjacent connecting links, and the shouldered faces of the recessed portions of said connecting links being beveled to conform to the bevel of the ends of the legs of said yokes, to provide stock in said connecting links adjacent the sprocket tooth receiving recess thereof, and to prevent the clogging of material between the ends of said yokes and said shouldered faces during pivotal movement of said links with respect to each other.

4. In a cutter chain for mining machines, a plurality of links pivotally connected together, said links including alternately arranged pivotally connected yokes and connecting eyes, each of which has a sprocket tooth receiving recess therein, the eye portions of each of said links having said connecting eyes being of a lesser thickness than the body portion of said links, to permit the outer sides of the legs of said yokes to be in the same planes as the planes of the outer sides of the body portions of said links having said connecting eyes, and the portions of said connecting eyes leading from said eyes to the body portion of said link being beveled outwardly to permit clearance between the legs of said yokes and to provide metal adjacent the sprocket tooth receiving portion of said connecting eye.

5. In a cutter chain for mining machines, a plurality of links pivotally connected together, said links including alternately arranged pivotally connected yokes and connecting eyes, each of which has a sprocket tooth receiving recess therein, the eye portions of each of said links having said connecting eyes being of a lesser thickness than the body portion of said links, to permit the outer sides of the legs of said yokes to be in the same planes as the outer sides of the body portions of said links having said connecting eyes, the portions of each connecting eye leading from said eyes to the body portion of said link being of an arcuate form and being inclined towards the center of said link from the inner to the outer sides thereof, to permit clearance between the legs of said yokes and the ends of said body portion, during pivotal movement of said links as the chain travels in its orbital path, without taking away metal from said link adjacent the sprocket tooth receiving recess thereof.

6. In a cutter chain for mining machines, a plurality of links pivotally connected together, said links including alternately arranged pivotally connected yokes and connecting eyes, each of which has a sprocket tooth receiving recess therein, the eye portions of each of said links having said connecting eyes being of a lesser thickness than the body portion of said links, to permit the outer sides of the legs of said yokes to be in the same planes as the planes of the outer sides of the body portions of said links having said connecting eyes, the portions of each connecting eye leading from said eye to the body portion of said link being beveled outwardly to permit clearance between the legs of said yokes and to provide metal adjacent the sprocket tooth receiving portion of said connecting eye, and the ends of the legs of said yokes being of an arcuate form, the face of which is formed by arcs struck from a plurality of radii of the same length, struck from a plurality of spaced centers, to form a beveled face from the outer to the inner side thereof which is inclined inwardly towards the center of said legs, to permit clearance between said legs and beveled faces of said connecting links.

7. In a cutter chain for mining machines, a plurality of links pivotally connected together, said links including alternately arranged pivotally connected yokes and connecting eyes, each of which has a sprocket tooth receiving recess therein, the eye portions of each of said connecting eyes being of a lesser thickness than the body portion thereof, to permit the outer sides of the legs of said yokes to be in the same planes as the planes of the outer sides of said connecting eyes, the portions of each connecting eye leading from said eye portions to the body portion of said link being of an arcuate form and being beveled outwardly from the inner to the outer side thereof towards the center of said link, to permit clearance between the legs of said yokes and connecting eye as the chain travels in its orbital path, without taking away metal from said link adjacent the sprocket tooth receiving recess thereof, and the ends of the legs of said yokes having faces inclined from the outer to the inner sides thereof and formed from arcs of uniform radii struck from spaced apart centers.

FRANK CARTLIDGE.

CERTIFICATE OF CORRECTION.

Patent No. 2,331,766.   October 12, 1943.

FRANK CARTLIDGE.

It is hereby certified that error appears in the printed specification of the above numbered patent requiring correction as follows: Page 3, second column, line 16, after "said" insert the words --links having said--; line 18, for "thereof" read --of said links--; line 20, before "said" insert --the body portions of said links having--; and that the said Letters Patent should be read with this correction therein that the same may conform to the record of the case in the Patent Office.

Signed and sealed this 11th day of January, A. D. 1944.

(Seal)

Henry Van Arsdale,
Acting Commissioner of Patents.